F. D. FADER.
MEAT SLICING MACHINE SUPPORT.
APPLICATION FILED OCT. 3, 1911.
1,013,756.
Patented Jan. 2, 1912.
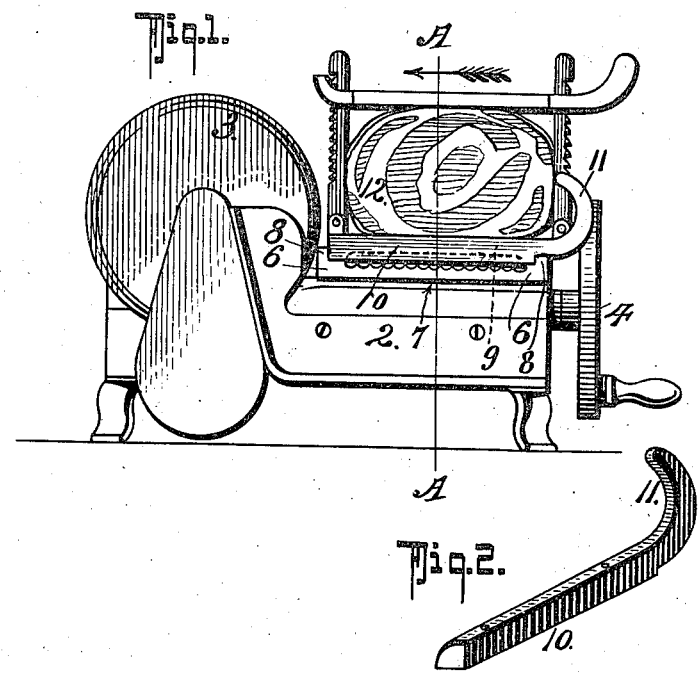
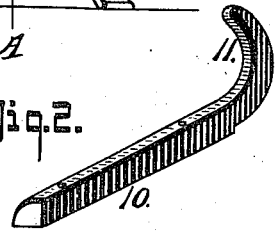
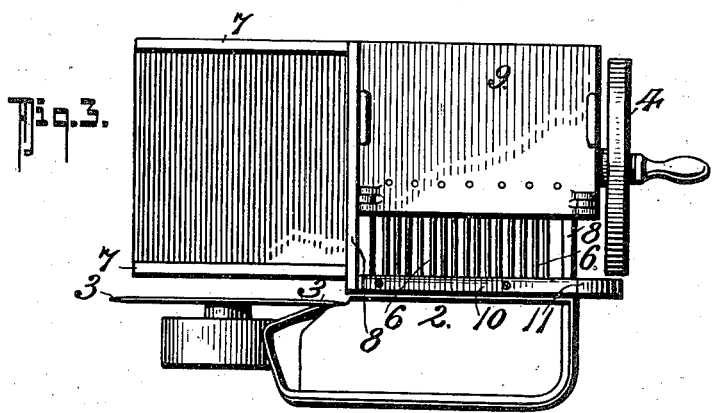
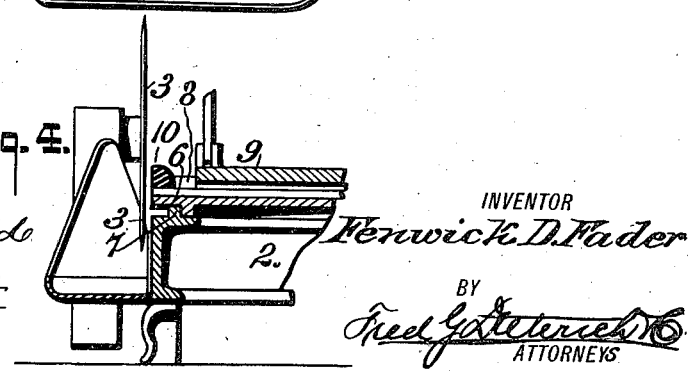
WITNESSES:
Hayward Woodard
John J. Schrott
INVENTOR
Fenwick D. Fader
BY
Fred G. Dieterich
ATTORNEYS

UNITED STATES PATENT OFFICE.

FENWICK D. FADER, OF VANCOUVER, BRITISH COLUMBIA, CANADA.

MEAT-SLICING-MACHINE SUPPORT.

1,013,756.   Specification of Letters Patent.   Patented Jan. 2, 1912.

Application filed October 3, 1911. Serial No. 652,633.

*To all whom it may concern:*

Be it known that I, FENWICK D. FADER, a citizen of the Dominion of Canada, residing at Vancouver, in the Province of British Columbia, Canada, have invented a new and useful Meat - Slicing - Machine Support, of which the following is a specification.

This invention relates to a provision on the slidable carriage of a meat slicing machine which provision is designed to support the meat in proximity to the plane of the cut against the downward and backward cutting effort of the knife. In these meat slicing machines, as at present made, the meat does not rest directly on the carriage on which it is reciprocated past the revolving knife but is secured on a supplementary carriage which is slidably mounted on the reciprocating one to move toward the cutting plane of the knife to give a slice by slice feed of the meat. The edge of this supplementary carriage must necessarily be kept back from the plane of the knife a sufficient amount to allow a certain range of slice feed without changing the position of the meat on the slice feed carriage and the meat is thus overhung from the feed carriage on which it rests over the reciprocating carriage and no support is provided to sustain it at the cut. In use the edges of this unsupported end bend down and form the cut of the knife and a considerable amount of waste is the result.

It is to meet this objection and provide a support for the overhanging end of the piece of meat adjacent to the cutting plane of the knife that the invention which is the subject of this application has been devised.

The invention is particularly described in the following specification, reference being made to the drawings by which it is accompanied, in which—

Figure 1 is an end view of the knife showing the relation of the slice feed and reciprocating carriages thereto. Fig. 2 is a detached perspective view of the support member, which is the subject of this application. Fig. 3 is a plan of the machine showing the application of the support. Fig. 4 is a section of the end of the carriage adjacent to the knife taken on the line A A in Fig. 1 in the direction of the arrow.

In these drawings 2 represents the main frame of the machine in which is rotatably mounted the disk knife 3 and the gearing by which it is driven from the handle wheel 4 which handle wheel also operates the other automatic mechanism of the machine such as the reciprocating carriage and the slice feed which mechanism not being material to this application, is not set forth. The reciprocating carriage 6, by which the meat is carried back and forth past the revolving disk knife 3, is movable in guides 7 parallel to the cutting plane of the disk knife.

Slidable on the upper side of the carriage 6 in guides 8 which are normal to the movement of that carriage and to the plane of the disk knife 3 is the slice feed carriage 9 to which the meat 12 is secured and by which it is intermittently fed up beyond the cutting plane of the knife the required thickness of slice for each reciprocation of the carriage 6. The face of this slice feed carriage 9 must naturally be kept far enough back from the cutting plane of the knife to afford a sufficient range of slice feed without requiring readjustment of the meat on the carriage 9, and the meat will thus overhang from the front edge of this carriage 9 to the cutting plane an amount equal to the depth of the carriage 9. This unsupported overhang in existing machines is objectionable, because having no support the lower and back edge of the meat will yield before the cut of the knife and prevent a satisfactory cut being made, and causes a considerable amount of waste. This defect I overcome by providing along the edge of the carriage 6 adjacent to the cutting plane of the disk knife 3 a supporting member 10 the upper side of which is at the approximate level of the top of the slice feed carriage 9 on which the meat is secured and the end of which is upwardly curved, as at 11, to support the meat against backward movement from the knife. As the meat resting on this support 10 must slide over it during its feed movement toward the plane of the knife 3 the corner at 12 farther from the knife is carefully rounded to facilitate that sliding movement. The meat is thus supported and held up to its cut and the considerable waste under the present construction of the machine is avoided.

The support 10, as made at present, forms an easily applied addition to existing machines but in new machines may, if thought desirable, be formed as an integral part of the reciprocating carriage 6. The provision is extremely simple but very effective in accomplishing the object for which it has been devised.

Having now particularly described my invention and the reason for its use, I hereby declare that what I claim as new and desire to be protected in by Letters Patent, is:

1. In a meat slicing machine a reciprocating carriage, a slice feed carriage movable at right angles to the movement of the reciprocating carriage, a raised support along the edge of the reciprocating carriage adjacent to the cutting knife said raised support projecting upward approximately to the level of the top of the slice feed carriage.

2. In a meat slicing machine, a reciprocating carriage, a slice feed carriage slidable on said reciprocating carriage and at right angles thereto, a meat support along the edge of the reciprocating carriage adjacent to the cutting knife said support projecting upward to the approximate level of the top of the slice feed carriage and having the end farther from the knife bent upward.

3. In a meat slicing machine, a reciprocating carriage, a slice feed carriage on which the meat is secured the movement of which is normal to that of the reciprocating carriage, a meat support along the edge of the reciprocating carriage adjacent to the cutting knife said support projecting up approximately to the level of the slice feed and having the corner farther from the knife rounded.

In testimony whereof I have signed my name to this specification in the presence of two subscribing witnesses.

FENWICK D. FADER.

Witnesses:
ROWLAND BRITTAIN,
WM. S. SOUTAR.